Patented July 16, 1946

2,404,208

UNITED STATES PATENT OFFICE 2,404,208

MANUFACTURE OF MOLDED ARTICLES

Donald Hugh Bangham, London, John Godolphin Bennett, Kingston-on-Thames, Robert Leslie Brown, Liverpool, Wallace Hirst, Kingston-on-Thames, Marcello Pirani, Kingston Hill, and George Cordery Phillpotts, London, England, assignors to C. D. Patents Limited, London, England, a company of Great Britain No Drawing. Application June 30, 1943, Serial No. 492,968. In Great Britain July 15, 1942

4 Claims. (Cl. 18—55)

This invention is an improvement in or a modification of the invention forming the subject matter of application Serial No. 491,238, filed June 17, 1943.

In that application there is described a process of producing shaped articles useful in industry which comprises finely comminuting bituminous coal having a content of volatile matter between 13 and 42 per cent calculated on the dry ash-free coal, and subjecting the same, preferably without the addition of any softening or binding agent, in a mold to a pressure of at least about 250 atmospheres at a temperature which is at least somewhat below 300° C. and under the pressure used lies between the temperature at which the coal begins to soften and that at which it ceases to be plastic, and which also is below the temperature of the onset of intumescence under the pressure used, maintaining such pressure and temperature until the material has agglutinated and the desired article is formed, releasing the pressure and cooling the article.

The effect of using a high pressure of at least about 250 atmospheres, for example, 250–600 atmospheres, is to produce or widen a temperature range between the beginning of plasticity and the onset of intumescence by causing intumescence to begin at a somewhat higher temperature than is the case when the coal is heated to atmospheric or other low pressure; and also to make the coal flow more readily. The range of molding temperature can be further widened by observing certain prescribed conditions which further raise the temperature of the onset of intumescence.

According to the present invention a process of producing shaped articles useful in industry, comprises, finely comminuting bituminous coal having a content of volatile matter between 13 and 42 per cent calculated on the dry ash-free coal, intimately mixing the same with a softening agent, and subjecting the mixture in a mold to a pressure of at least about 250 atmospheres at a temperature which is at least 256° C. and under the pressure used lies between the temperature at which the mixture as a whole begins to soften and that at which it undergoes intumescence, the said softening agent serving to cause the mixture to begin to soften at a lower temperature than that at which the coal treated would soften if heated alone, and being present in a proportion sufficient under the pressure used to produce a mixture with the particular coal treated which will soften without undergoing intumescence and not exceeding about 35 cc. per 100 grams of coal, maintaining such pressure and temperature until the material treated has agglutinated and the desired article is formed, releasing the pressure and cooling the molded article.

The term "softening agent" is used herein and in the appended claims to denote material selected from the following classes: Coal tar middle oil, coal tar heavy oil, coal tar anthracene oil, coal tar pitch (including pitches which have been treated to drive off substantially all matter volatilisable below 350° C.); aromatic compounds boiling above 180° C. under atmospheric pressure which are hydrocarbons or derivatives of benzene, anthracene, phenanthrene or like aromatic hydrocarbons, and which are stable at the molding temperature, such derivatives including phthalic acid esters and aryl esters of phosphoric acid; naphthenic and heterocyclic compounds; petroleum residues; soft bitumen; and chlorinated paraffin waxes. As examples of softening agents within the foregoing classes there may be mentioned: anthracene oil, road tar, phenols, aromatic bases, pyridine bases, diphenyl, quinoline, anthracene, phenanthrene, acenaphthene, carbazole, acridine, furfuryl alcohol, benzaldehyde, benzophenone, benzoic acid, nitrobenzene, dibutyl phthalate, tricresyl phosphate, and the chlorinated paraffin wax marketed under the registered trade-mark "Cerechlor." All the above substances are softening agents for the coal in the sense that they cause the mixture of the coal therewith to soften at a lower temperature than does the coal when heated alone.

The coal-softening agent mixture softens at a lower temperature than does the coal when heated alone, and the intumescence temperature of the mixture as compared with that of the coal alone is either not lowered or lowered to a much less extent than the softening temperature. Accordingly, as compared with the effect of the high pressure used in application Serial No. 491,238, filed June 17, 1943, the softening agent has the effect of further widening the range of molding temperatures by lowering the temperature at which molding can be performed. Thus, for example, a strongly caking Yorkshire coal having a content of volatile matter of 36 per cent when molded alone had a molding temperature range of 345° C. to 350° C. When the same coal was molded in admixture with 10 cc. of anthracene per 100 grams of coal it was found that excellent moldings could be obtained at temperatures ranging from 261° C. to 293° C.

It may also be desirable to observe the conditions described in the aforesaid application for raising the temperature of the onset of intumescence. These conditions, which are described in the aforesaid application with reference to coal alone, serve in like manner to raise the temperature of the onset of intumescence of the coal-softening agent mixture, and are especially advantageous in the case of coal-softening agent mixtures of which the temperature of the onset of intumescence is below that of the coal alone. Thus, by incorporating an absorbent filler with the coal-softening agent mixture volatiles can be assimilated so that the temperature of the onset of intumescence is raised. Furthermore, the coal-softening agent mixture may first be subjected to a moderately high pressure, for example 50 to 150 atmospheres, while the mixture is being heated to the molding temperature, and then subjected to the full molding pressure, for example, 300 to 450 atmospheres, at the molding temperature. The temperature of the onset of intumescence can also be raised by "breathing" the mold by releasing the pressure at least once during the molding operation, or by degassing the coal or the coal-softening agent mixture by a preliminary heat treatment, if desired under reduced pressure, at a temperature below the molding range. In the case of softening agents which contain dissolved or occluded gas they may be degassed before admixture with the coal. As, however, the lowering of the intumescence temperature is not always dependent solely on the nature of the softening agent, it is generally preferable to apply the preliminary degassing treatment to the coal-softening agent mixture as stated above.

The coal must be comminuted to a very fine state of subdivision as described in the aforesaid application. Thus, the coal is preferably comminuted until at least 30 per cent thereof has a particle size not exceeding $10\mu$, and it is preferably also graded as to particle size so as to secure a high degree of close packing.

The coal-softening agent mixture may be molded with the addition of granular or fibrous filling materials, which in the case of granular materials are preferably comminuted so as to pass a sieve of 100 mesh B. S. S. or finer, for example, 200 mesh, and which comminuted granular materials are, if desired, graded as to particle size to secure a high degree of close packing. Such materials are for example finely divided organic materials, glasses, minerals, metals or powdered coke, and must be such as not to be rendered ineffective by the conditions of temperature, pressure and gaseous atmosphere under which the molding is carried out. The addition of powdered or fibrous asbestos, powdered or fibrous glass, steel filings, fine steel wool, powdered ferrosilicon, quartz meal or aluminium powder reinforces the products and prevents shrinkage cracks. In some cases it is advantageous to use as a filler finely ground electrode carbon. Such a filler is very suitable when a wholly carbon structure is desired in the molded article. In all cases the filling materials are preferably dried before incorporating them with the finely divided coal. Mixtures of two or more of the above filling materials may be used.

The relative proportions of coal and filler may be varied as may be required; usually the filler will constitute from 5 to 60 per cent by weight of the mixture to be molded.

As an absorbent filler for the purpose of assimilating volatiles as described above there may be used powdered coke. Instead of powdered coke, finely divided inorganic materials of a highly porous and absorbent character, such as colloidal silica or alumina, may be used. The mechanical properties of a product molded from such a blend may be improved by the addition of reinforcing filling materials as already described.

The articles molded from a coal-softening agent mixture alone in accordance with the invention appear to the eye to have a homogeneous and non-porous structure, and they have a conchoidal fracture, do not produce a black streak when rubbed on paper, and are substantially unaffected by boiling toluene. As might be expected from their homogeneous and non-porous appearance, the porosity of the products is low and may, for example, be less than 3 per cent, when measured by immersing an evacuated molded specimen of about ¼ inch thickness for 2 hours in water containing a wetting agent, and calculating the porosity from the increase in weight of the specimen. The products also have a resistance to acids and alkalies similar to that of the products of the aforesaid specification, but usually have greater mechanical strength. The products obtained at temperatures within the upper half of the molding temperature range have a shinier and better appearance than those obtained at lower temperatures.

The mixing of the softening agent with the powdered coal may be performed in any suitable manner so as to obtain an intimate and uniform mixture. Difficulty may be experienced in obtaining proper mixing in the case of softening agents of a sticky nature, such as thick road tar, soft bitumen and soft pitch, owing to the tendency of such softening agents to cause local agglomeration. This difficulty may be overcome by conducting the mixing in the presence of a volatile solvent for the softening agent, for example, benzene. For this purpose the comminuted coal and softening agent may be mixed together with the addition of sufficient benzene to form a thin paste, which is then stirred until the mixing is complete, and the benzene is finally removed by evaporation. Alternatively the softening agent may first be dissolved in sufficient benzene to give a liquid solution and the solution mixed with the comminuted coal. The whole is then mixed, for example, in a ball mill, and the benzene removed from the mixture by evaporation.

The following examples illustrate the invention, the parts being by weight:

*Example 1*

Yorkshire Bright coal of strongly caking character and having a content of volatile matter of 36 per cent (calculated on the dry ash-free coal) is ground and graded to give a substantially uniform distribution of the following particle sizes:

100 per cent of the coal less than $30\mu$
95.5 per cent of the coal less than $25\mu$
91.0 per cent of the coal less than $20\mu$
81.5 per cent of the coal less than $15\mu$
59.5 per cent of the coal less than $10\mu$
26.0 per cent of the coal less than $5\mu$
2.5 per cent of the coal less than $2\mu$ The particle sizes are those determined by means of a photo-electric sedimentometer.

170 grams of the ground coal are well mixed in a ball mill for about 15 minutes with 30 cc. of coal tar pitch which has been previously degassed by heating at 300° C. while stirring for one hour. The mixture is placed in a 5 inch disc mold which is insulated at the sides by means of an electric heating collar to prevent excessive heat losses.

The mold is then closed and placed between the platens of a 50 ton press. The platens are electrically heated, and the temperature of the charge is regulated by means of a thermostat controlled by a thermocouple disposed in the mold. The charge is subjected to a pressure of 100 atmospheres and heated up to a temperature of 280° C.±5° C. When this temperature is reached, or after heating for 5 minutes if the said temperature is reached in less than that time, a full molding pressure of 450 atmospheres is applied, and this pressure is maintained for 20 minutes. The pressure is then released, and the molded article is immediately ejected from the mold and allowed to cool slowly. The molded article is black and has a shiny surface, and has a porosity of less than 3 per cent.

*Example 2*

100 grams of the ground coal described in Example 1, 80 grams of fused alumina which has been ground to pass a 200 B. S. S. mesh sieve and 20 cc. of degassed coal tar pitch as used in Example 1 are well mixed together in a ball mill for about 15 minutes. The mixture is molded under pressure in a 5 inch disc mold by the same procedure as that described in Example 1.

The molded article is black and has a less shiny surface, but better mechanical strength, than the product of Example 1.

*Example 3*

Northumberland (Ellington High Main) coal having a content of volatile matter of 37 per cent (calculated on the dry ash-free coal) is ground and graded to give a substantially uniform distribution of the following particle sizes:

100 per cent of the coal less than $53\mu$
90.1 per cent of the coal less than $40\mu$
80.5 per cent of the coal less than $20\mu$
50.8 per cent of the coal less than $10\mu$
15.6 per cent of the coal less than $5\mu$
1.8 per cent of the coal less than $2\mu$ The particle sizes are those determined by means of a photo-electric sedimentometer.

A cut back road tar obtained from a coal distillation plant is used as softening agent. The tar has a viscosity of 120 seconds and a specific gravity of 1.10 at 15.5° C., and consists of 3–8 per cent of material distilling at 230–270° C., 4–9 per cent distilling at 270–300° C., 85–88 per cent of residue at 300° C. and a trace of water. The tar is degassed by heating it with constant stirring up to 350° C. and maintaining this temperature for one hour while stirring. The degassed tar is then allowed to cool, after which it is crushed and ground to pass a 72 B. S. S. mesh sieve.

170 grams of the ground coal are well mixed in a ball mill with 30 cc. of the ground, degassed road tar. The mixture is molded by the procedure described in Example 1, except that in this case the molding temperature is 300° C. The molded article has properties similar to that of Example 1.

*Example 4*

The procedure is the same as in Example 3, except that the preliminary pressing at 100 atmospheres is omitted and the full pressure of 450 atmospheres is applied immediately. During the period of heating up and molding the mold is "breathed" by releasing the pressure several times, thereby permitting the gases evolved to escape from the charge.

*Example 5*

182 grams of the ground coal described in Example 1 are mixed with 18 cc. of tricresyl phosphate, and the mixture is molded by the procedure described in Example 1, except that the molding temperature is 300–312° C. and this temperature is maintained at the full molding pressure for 10 minutes. The molded article so obtained has a good shiny appearance and a porosity of less than 3 per cent.

*Example 6*

182 grams of the ground coal used in Example 1 are mixed with 18 cc. of dibutyl phthalate, and the mixture is molded by the procedure described in Example 1, except that the molding temperature is 256° C. and this temperature is maintained at the full molding pressure for 10 minutes. The molded article so obtained has a good shiny appearance and a porosity of less than 3 per cent.

We claim:

1. The process of producing shaped articles useful in industry, which comprises, finely comminuting bituminous coal having a content of volatile matter between 13 and 42 per cent calculated on the dry ash-free coal, intimately mixing the same with a softening agent, and subjecting the mixture in a mold to a pressure of at least about 250 atmospheres at a temperature which is at least 256° C. and under the pressure used lies between the temperature at which the mixture as a whole begins to soften and that at which it undergoes intumescence, the said softening agent serving to cause the mixture to begin to soften at a lower temperature than that at which the coal treated would soften if heated alone, and being present in a proportion sufficient under the pressure used to produce a mixture with the particular coal treated which will soften without undergoing intumescence and not exceeding about 35 cc. per 100 grams of coal, maintaining such pressure and temperature until the material treated has agglutinated and the desired article is formed, releasing the pressure and cooling the molded article.

2. The process of producing shaped articles useful in industry which comprises, finely comminuting bituminous coal having a content of volatile matter between 13 and 42 per cent calculated on the dry ash-free coal, until at least 30 per cent of the coal by weight has a particle size not exceeding $10\mu$, intimately mixing the same with a softening agent, and subjecting the mixture in a mold to a pressure of at least about 250 atmospheres at a temperature which is at least 256° C. and under the pressure used lies between the temperature at which the mixture as a whole begins to soften and that at which it undergoes intumescence, the said softening agent serving to cause the mixture to begin to soften at a lower temperature than that at which the coal treated would soften if heated alone, and being present in a proportion sufficient under the pressure used to produce a mixture with the particular coal treated which will soften without undergoing intumescence and not exceeding about 35 cc. per 100 grams of coal, maintaining such pressure and temperature until the material treated has agglutinated and the desired article is formed, releasing the pressure and cooling the molded article.

3. The process of producing shaped articles useful in industry, which comprises, finely comminuting bituminous coal having a content of volatile matter between 13 and 42 per cent calculated on the dry ash-free coal, intimately mixing the same with a softening agent, mixing therewith a comminuted inert absorbent filling material, adapted to assimilate volatiles and which does not soften or undergo destructive distillation at the molding temperature used, and subjecting the mixture in a mold to a pressure of at least about 250 atmospheres at a temperature which is at least 256° C. and under the pressure used lies between the temperature at which the mixture as a whole begins to soften and that at which it undergoes intumescence, the said softening agent serving to cause the mixture to begin to soften at a lower temperature than that at which the coal treated would soften if heated alone, and being present in a proportion sufficient under the pressure used to produce a mixture with the particular coal treated which will soften without undergoing intumescence and not exceeding about 35 cc. per 100 grams of coal, maintaining such pressure and temperature until the material treated has agglutinated and the desired article is formed, releasing the pressure and cooling the molded article.

4. The process of producing shaped articles useful in industry, which comprises, finely comminuting bituminous coal having a content of volatile matter between 13 and 42 per cent calculated on the dry ash-free coal, intimately mixing the same with a softening agent, subjecting the mixture in a mold to a pressure of about 50 to 150 atmospheres while progressively heating up to a desired molding temperature for a few minutes and thereupon raising the pressure to at least about 250 atmospheres while maintaining the temperature within the range in which the mixture as a whole is plastic but below the temperature at which, after the stated preliminary treatment and at the pressure used, intumescence takes place, and which is at least 256° C., the said softening agent serving to cause the mixture to begin to soften at a lower temperature than that at which the coal treated would soften if heated alone, and being present in a proportion not exceeding about 35 cc. per 100 grams of coal, maintaining such pressure and temperature until the material treated has agglutinated and the desired article is formed, releasing the pressure and cooling the molded article.

DONALD HUGH BANGHAM.
JOHN GODOLPHIN BENNETT.
ROBERT LESLIE BROWN.
WALLACE HIRST.
MARCELLO PIRANI.
GEORGE CORDERY PHILLPOTTS.